(12) United States Patent
Derkach

(10) Patent No.: US 8,904,652 B2
(45) Date of Patent: Dec. 9, 2014

(54) GRID FOR INDICATING LOCATION OF EVIDENCE

(71) Applicant: Susan Ann Derkach, Freehold, NJ (US)

(72) Inventor: Susan Ann Derkach, Freehold, NJ (US)

( * ) Notice: Subject to any disclaimer, the term of this patent is extended or adjusted under 35 U.S.C. 154(b) by 148 days.

(21) Appl. No.: 13/742,414

(22) Filed: Jan. 16, 2013

(65) Prior Publication Data

US 2014/0196295 A1   Jul. 17, 2014

(51) Int. Cl.
   *G01C 15/04*   (2006.01)
(52) U.S. Cl.
   CPC .................................. *G01C 15/04* (2013.01)
   USPC .............................................. 33/1 G; 33/562
(58) Field of Classification Search
   USPC ................... 33/1 G, 1 H, 121, 562, 565, 566
   See application file for complete search history.

(56) References Cited

U.S. PATENT DOCUMENTS

| | | | | |
|---|---|---|---|---|
| 4,228,588 A | * | 10/1980 | Horton, Jr. ...................... | 33/1 H |
| 5,107,595 A | * | 4/1992 | Stay et al. ....................... | 33/1 G |
| 5,673,489 A | * | 10/1997 | Robell ............................. | 33/566 |
| 6,421,926 B1 | * | 7/2002 | Cappuccio ...................... | 33/413 |
| 6,839,971 B2 | * | 1/2005 | Schafer et al. .................. | 33/566 |
| 6,854,189 B2 | * | 2/2005 | Schafer ........................... | 33/562 |
| 2003/0079360 A1 | * | 5/2003 | Ziegler ............................ | 33/562 |
| 2006/0191150 A1 | * | 8/2006 | Sikora et al. .................... | 33/566 |
| 2010/0180459 A1 | * | 7/2010 | Redmond et al. ............... | 33/562 |
| 2012/0204437 A1 | * | 8/2012 | Nethery .......................... | 33/566 |

* cited by examiner

*Primary Examiner* — G. Bradley Bennett

(57) ABSTRACT

There is provided a grid system (10) containing a set of stakes (40), a grid (20) and a key (3) that can be transported to a crime scene to create a working area in which evidence can be accurately cataloged as to its precise location at the time of its discovery. The grid strings (21) are secured to the grid rings (22, 23, 24) to form a grid (20). The grid rings (22, 23, 24) attach to the stakes (40). The key (30), which also attaches to the stakes (40) ensures that the grid (2) is square. The preferred embodiment features a key (30) comprising two key rings (32) and a key string (31). The key (30), when fully extended to opposite corners of the grid (20), forms the shared hypotenuse to the right triangles on either side of the key (30) formed by the grid (20), thereby forming a grid system (10) The stakes (40) can be ribbed in a way to enable the grid rings (22, 23, 24, 32) to remain at a distinct position along the stake (40). This enables the grid rings (22, 23, 24) to be placed at a particular height along the stakes (40) to better control the distance the grid (20) is from the ground to help with leveling and measuring purposes.

10 Claims, 5 Drawing Sheets

GRID FOR INDICATING LOCATION OF EVIDENCE

CROSS-REFERENCE TO RELATED APPLICATIONS

None.

BACKGROUND OF THE INVENTION

1. Field of the Invention

The present invention relates to a grid that aids in designating the location and collection of evidence. More particularly, the present invention relates to a transportable preset grid for the measuring and designating the location of evidence, such as buried or surface artifacts or human remains at a crime scene.

2. Description of Related Art

It is accepted and standard to provide a "grid" at an outdoor or otherwise large area such as a crime scene, archeological dig or other scenes to create a working area in which evidence, artifacts, etc. can be accurately catalogued as to its precise location at the time of its discovery. (This is useful in scenes that are not contained within a structure, vehicle or other site wherein evidence or other items can easily be located off of permanent measurable datum points.) The grid is labeled by row and column (Column A, B, C . . . Row 1, 2, 3 . . . ), and the location of any evidence found is denoted by the section of the grid in which it was found. If a question arises at a later date, such as later in the investigation or at trial, as to where a piece of evidence was located and its relevance to the rest of the scene, the scene can be "re-enacted".

For example, at the site where a body or other evidence is potentially buried, an investigative team establishes the probable location of evidence—and over that area constructs a grid. The following describes how establishing a grid is currently typically carried out.

First, the investigators determine the size of the area to be gridded. At least one datum point must be determined—something permanent that can be referred to at a future date. A wooden stake is driven into the ground at the outside corner of the area of interest and measured off of the datum point(s). Then, a mason's line is tied to the first stake, measured out the desired length and a second stake is driven into the ground. The line is then tied off on the second stake. A line level is then used to check the level of the string, and the string is raised or lowered to achieve level.

Then the second side is measured out. But before the third stake can be placed, the second side must be made square to the first using either the hypotenuse of the size of the grid being strung, or the 3-4-5 rule. To use the hypotenuse of the desired area, for example 12 feet by 12 feet, Pythagorean's Theorem ($a^2+b^2=c^2$) is used to determine the hypotenuse. In this case, the hypotenuse would be 16.97 feet. One pair of investigators hold the measuring tape for the length of the side while another pair measure out the hypotenuse, all persons ensuring that the measurements are accurate and line up. The 3-4-5 rule (which also uses Pythagorean's Theorem) states that if one side of a right triangle equals 3 feet and the second side equals 4 feet, then the hypotenuse equals 5 feet. Again, it requires multiple persons to hold the measuring tapes (this time three of them) and move the lines until square is achieved. While the strings and tape measures are being held, it must be visually checked that no lines are being bent and that the lines are all straight. This process is repeated for the establishing the third side of the grid, and if all goes well, the fourth side should be the correct length. Ideally, square is then double-checked by measuring both hypotenuses and ensuring they are the same length. If not, adjustments can be made at this time by relocating the stakes at the corners. Level is re-checked, then the process of measuring and locating the inside lines of the grid begins. After all is said and done, much effort and manpower has been expended. In current protocol, mason line is typically used, which is affected greatly by time, stress and the elements. These grids can potentially need to be in place for days at a time, and when the lines sag they need to be tightened and all measurements re-checked.

Inherent shortcomings associated with this method are that it is complicated, requires multiple personnel to carry out and relies heavily on human nature and interpretation. An individual's training in accurate measurement, their eyesight, their level of fatigue, their overall work ethic and environmental factors such as weather and wildlife are all factors that could possibly add to inaccuracies in the construction of the grid, and therefore the locating of evidence. There can always be a significant margin of error in this process. In addition, it takes a significant amount of time to string a grid, and the passage of time can be detrimental to the condition of the evidence and delay its discovery. There is a need for a device that can be easily transported and can be quickly, accurately and consistently set up and be confidently relied upon.

OBJECT AND SUMMARY OF THE INVENTION

It is an objective of the present invention to overcome shortcomings of the method described above. This and other objectives are achieved by the present invention described herein.

The present invention achieves these objectives by providing a preset, premeasured, fixed grid system consisting of a set of grid stakes, a grid key and premeasured strings permanently set in a grid. It can be easily transported to any location to create a working area in which evidence can be accurately catalogued as to its precise location at the time of its discovery. The grid strings are secured at intersecting points by plastic rings that work in conjunction with the stakes. The key is a preset, premeasured hypotenuse that corresponds to the size grid being employed.

The preferred embodiment features a key comprised of a string with a ring at each end. The key, when fully extended between the stakes on opposite corners of the grid, forms the shared hypotenuse to the right triangles on either side of the key. The stakes and rings interact in a way (ribbing, friction, materials, etc.) that enables the grid and the key to remain in the desired position on the stake. This enables the grid to be placed and maintained at a particular height for leveling and measuring purposes. The strings are attached to and center-aligned with the rings so that, if the strings were continuous, they would pass through the center of the rings and stakes. By using this center-line method, the grid can simply and quickly be expanded in any or all directions by attaching another grid to two of the stakes on one side of the originally placed grid, and then using two more stakes for the outside end of the new grid. The shared side of the two grids would align, ensuring a continuous and accurate system of measurement.

The setting up of the grid can be accomplished by one person alone in a few minutes, rather than requiring several people working in conjunction with one another for an extended period of time. For larger areas, or in cases where the evidence is found to extend beyond the initial perceived area of interest, multiple grid networks can be combined to cover a much larger area of ground. The grid is designed so that attaching one grid to the next creates a continuous system of measurement.

In the preferred embodiment, the rings throughout the entire grid are all of the same size, shape and material, in order to gain flexibility in how the grid can be set up. In other embodiments, they may be of other shapes, sizes and styles. In addition to the full square setup described heretofore, the grid may be set up in non-square configurations providing square has been attained with the key. For example, investigators determine that an area of interest is next to a tree. They can set up the opposite corners of the grid with the key, then bring the rest of the grid taut with whatever room they have by using a stake in any of the rings in the entire grid. Therefore, they can leave off a small corner or an entire triangle half.

In a preferred embodiment, the process for setting up the grid is as follows: The grid is loosely laid out over the area of interest. A corner of the grid, then one end of the key is placed onto a stake which is then put in the ground. At the opposite corner, the grid corner and then the key are placed onto the second stake. The stake is pulled taut, then put in the ground. At each of the remaining two corners, the grid corner is placed onto a stake, pulled taut and put in the ground. The key can now removed for easier examination of the sections that it intersected.

Future accoutrements to this system include, but are not limited to, stakes designed for various terrains, different units of measure, color coordinating for various sizes/measurements or other reasons, a method of using the grid on impenetrable surfaces such as warehouse floors and parking lots, and a method of locking together overlapping rings when grids are combined.

BRIEF DESCRIPTION OF THE DRAWINGS

The present invention is more fully understood by reference to the following detailed description of an illustrative embodiment with the drawings identified below.

DETAILED DESCRIPTION OF THE INVENTION

Figure 1:
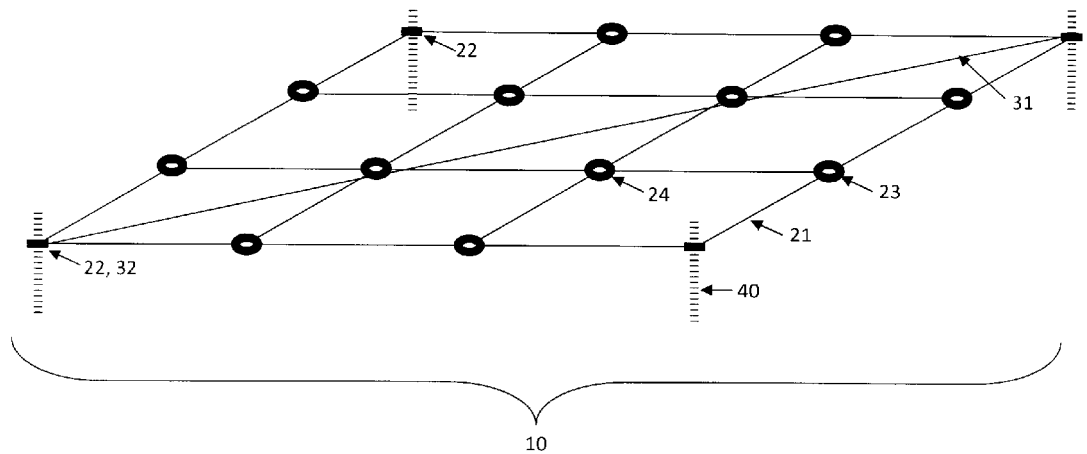
FIG. 1 is a perspective view of the grid system in accordance with a preferred embodiment of the present invention.

FIG. 1 shows a perspective view of the grid system 10 in accordance with a preferred embodiment of the present invention. The grid system 10 setup generally contains a set of stakes 40, a grid 20 consisting of grid strings 21 and grid rings 23, 23, 24, and a key 30 consisting of a key string 31 with a key ring 32 at each end. The stakes 40 and grid 20 form a square or rectangular configuration when fully set up. In a preferred embodiment, the grid strings 21 and key strings 31 are non-stretchable to minimize sagging and stretching that could possibly cause inaccuracies in the measurements. The stakes 40 are preferably made of plastic or other non-metal material to eliminate interference with the use of hand-held metal detectors, which are frequently used to help determine the specific area of interest at a suspected burial site or other scene. In one embodiment, the grid system 10 could be manufactured in a variety of sizes and colors to accommodate different needs, sizes or systems of measurement. In alternate embodiments, the stakes 40 would be manufactured in several styles. One style could be short and long pointed stakes 40 for outdoor applications, whereby the longer stakes 40 would be useful for softer substrates. Another style could be flat-bottomed, tabbed sleeves into which the stakes 40 would be inserted, that could be weighted, taped down or otherwise secured for application on impervious surfaces. The grid system 10 can be rolled up or folded in a way so that it comprises a very small amount of space and is very transportable.

Figure 1A:
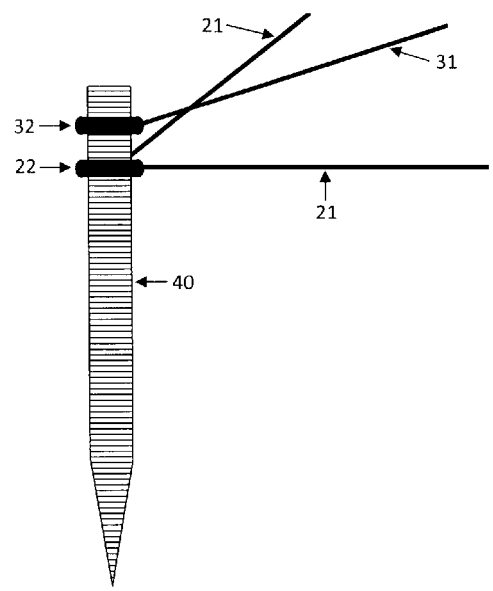
FIG. 1A is an enlarged perspective view of a grid stake with the key and a corner of the grid in place in accordance with a preferred embodiment of the present invention.

FIG. 1A is an enlarged perspective view of a corner of the grid system 10 when it is set up. A grid corner ring 22 has first been placed on a stake 40, and then one key ring 32 of the key 30 is placed above it.

Figure 2:
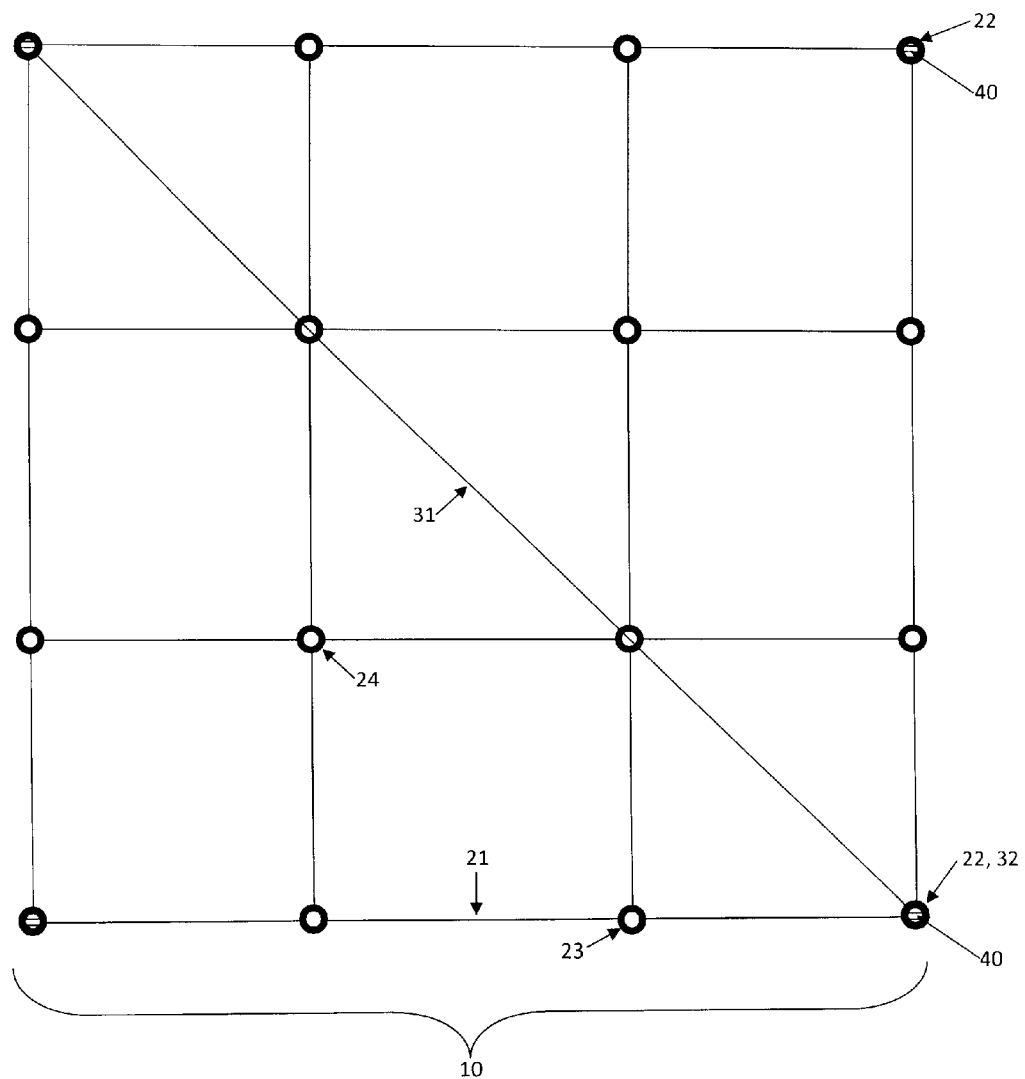
FIG. 2 is a top view of the grid system in accordance with a preferred embodiment of the present invention.

FIG. 2 shows a top view of the grid system 10 set up. The grid 20 is secured to the stakes 40 by grid corner rings 22. In a preferred embodiment, the grid strings 21 and grid rings 22, 23, 24 are prefabricated in a way that they are fastened to one another to form a single "grid" 20. The grid rings 22, 23, 24 are placed at each point that, were the entire grid 20 made of string, the strings would intersect. The grid rings 22, 23, 24 consist of grid corner rings 22, which are located at the corners of the grid 20, grid side rings 23 located at the sides of the grid 20, and grid center rings 24, which are located at positions within the grid 20 when the grid 20 is set up.

Figure 3:
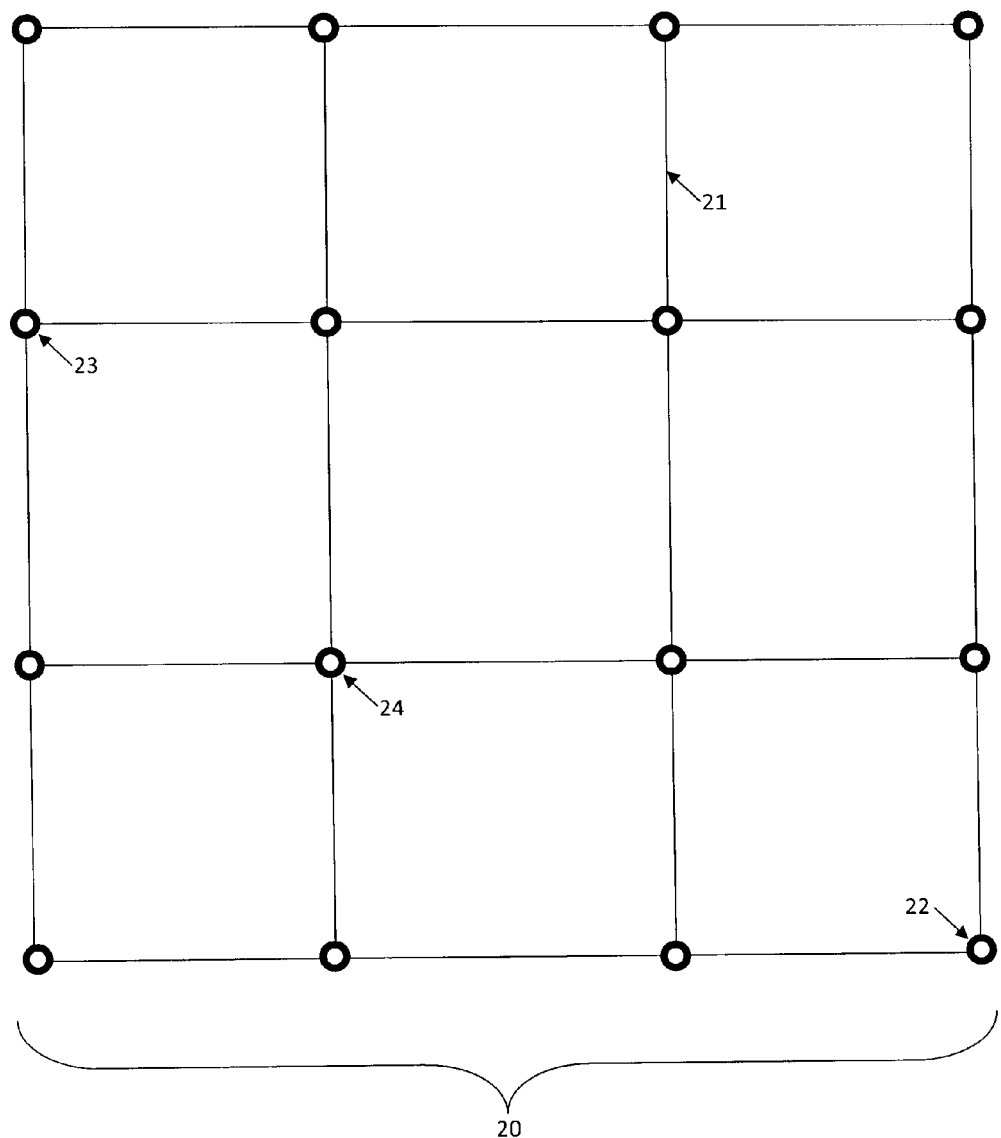
FIG. 3 is a top view of the grid in accordance with a preferred embodiment of the present invention.

FIG. 3 shows a top view of the grid 20. The grid 20 consists of grid strings 21 set into a permanent grid shape by grid corner rings 22, grid side rings 23 and grid center rings 24.

Figure 3A:
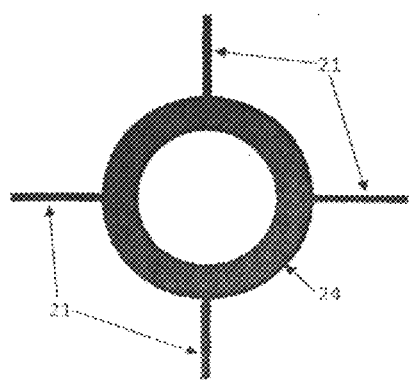
FIG. 3A is a top view of a center ring of the grid in accordance with a preferred embodiment of the present invention.
Figure 3B:
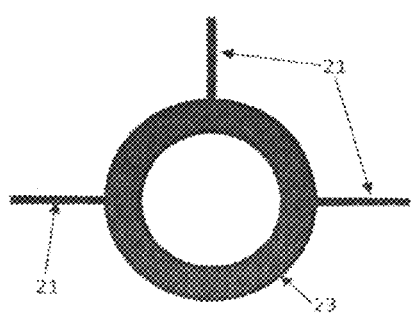
FIG. 3B is a top view of a side ring of the grid in accordance with a preferred embodiment of the present invention.
Figure 3C:
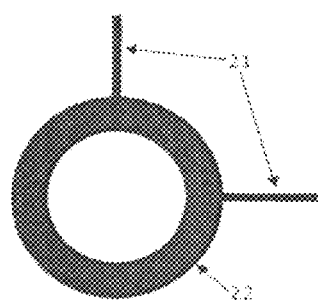
FIG. 3C is a top view of a corner ring of the grid in accordance with a preferred embodiment of the present invention.
Figure 3D:
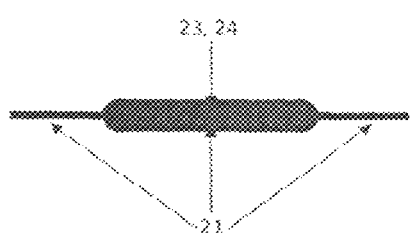
FIG. 3D is a side view of a center ring or a side ring for the grid in accordance with a preferred embodiment of the present invention.

FIG. 3A shows a top view of a grid center ring 24 in a preferred embodiment of the present invention. FIG. 3B shows a top view of a grid side ring 23 and FIG. 3C shows a top view of a grid corner ring 22. A side elevation view of a grid side ring 23 or grid center ring 24 is provided in FIG. 3D.

Figure 4:
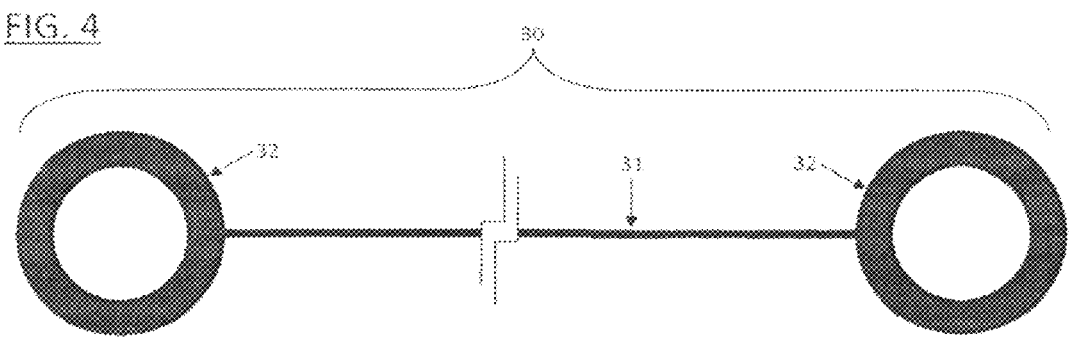
FIG. 4 is a top view of the key in accordance with a preferred embodiment of the present invention.

FIG. 4 is a top view of the key 30, showing a key ring 32 at each end of the key string 31.

Figure 5:
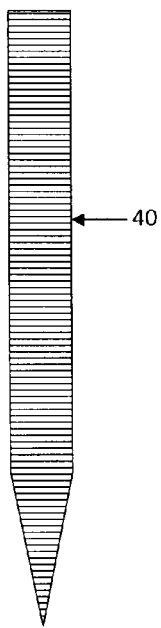
FIG. 5 is a side view of a stake in accordance with a preferred embodiment of the present invention.
Figure 5A:
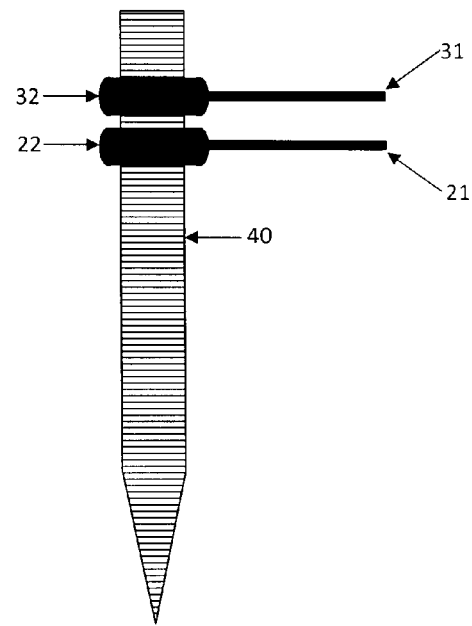
FIG. 5A is a side view of a stake, with a corner of the grid and key in place in accordance with a preferred embodiment of the present invention.

FIG. 5 is a side view of a stake 40. FIG. 5A is a side view of a stake 40 with a grid corner ring 22 and a grid key ring 32 in place. The stakes 40 and rings 22, 23, 24, 32 are preferably comprised of a plastic or other material that prevents slippage and ensures consistent measurements. The stakes 40, grid 20 and key 30 form a grid system 10.

In a preferred embodiment, the stakes 40 can be ribbed in a way to enable the grid rings 22, 23, 24 and key rings 32 to snap into a distinct height position along the stake 40. This enables the grid rings 22, 23, 24 to be placed at a particular variety of heights along the stakes 40 to better determine the distance the grid strings 21 are from the ground and to help with leveling and measuring purposes. In another embodiment, the stakes 40 can have measuring or tic marks to visually display how far into the ground the stakes 40 have been sunk, as well as how far down a grid ring 22, 23, 24 has been placed down along the stake 40. In another embodiment, the grid strings 21 have markings that show distance measurements.

In the preferred embodiment, the grid system 10 consists of a key 30, as shown in FIG. 4. The key 30 is comprised of two key rings 32 and a key string 31. The key rings 32 and key string 31 may or may not be of the same material and construction as the grid strings 21 and grid rings 22, 23, 24 of the grid 20 itself. The key rings 32 are preferably constructed in the same or similar fashion as the grid rings 22, 23, 24. The key rings 32 being of the same material and design as the rest of the grid rings 22, 23, 24 enables the grid 20 and key 30 to be placed onto the same stakes 40 at the same time. FIG. 4 shows the top view of key ring 32 and key string 31. The key 30, when fully extended, forms the shared hypotenuse to the right triangles on either side of the key 30 that are formed by the grid 20.

The grid system 10 can be transported to a crime scene or other location by any means, such as in a bag, a box or within a kit, for example. Typically at a suspected scene, the area of interest is determined and datum points are selected. The grid 20 is then laid out over the area of interest, taking care to disturb the area as little as possible. A grid corner ring 22 is placed onto a stake 40. A key ring 32 is then also placed onto the same stake 40. The stake 40 with the grid corner ring 22 and key ring 32 is then driven into the substrate at a first position deep enough to secure it.

The grid corner ring 22 on the opposite corner of the grid 20 is then placed onto a second stake 40. The opposite key ring 32 is then also placed onto the second stake 40. The grid key 30 is then pulled fully taught and the stake 40 is then driven into the ground at the second position, which is located at the opposite corner of the area of interest.

One of the remaining grid corner rings 22 is then placed onto a third stake 40. That third stake 40 is pulled until the grid 20 is taught and then that stake 40 is driven into the ground at the third position. This same procedure is then repeated for the remaining fourth stake 40 and grid corner ring 22 at the fourth corner position. This will ensure that the grid strings 21 are at right angles to one another for accurate measuring purposes. The grid corner rings 22 can then be adjusted on the stakes 40 so that the grid 20 is level. The grid corner rings 22 interlock with the stakes 40 so that if a grid string 21 is accidentally bumped or tripped over by someone, the grid 20 is much less likely to be disrupted. If up to two stakes 40 are pulled out, the grid 20 can be re-established without even using the key 30, and without compromising the integrity of the investigation or recovery of evidence of the crime scene.

For larger areas, multiple grid systems 10 can be combined to cover a much larger area. Should a scene expand unexpectedly or is initially a larger scene, more than one grid 20 can be connected while maintaining consistent and accurate measurements across the entire scene. Two adjacent grid corner rings 22 of a second grid 20 could be placed onto to adjacent stakes 40 of the first grid system 10, thereby significantly increasing the size of the overall area that could be covered.

While a preferred embodiment of the invention has been herein disclosed and described, it is understood that various modifications can be made without departing from the scope of the invention.

What is claimed is:

1. A device for measuring the location of evidence comprising a grid of premeasured strings and rings, stakes and a key.

2. The device of claim 1, wherein said key comprises a premeasured string and a ring at each end.

3. The device of claim 1, wherein said key forms a shared hypotenuse of right triangles of said grid on either side of said key when the strings of said key and said grid are fully extended.

4. The device of claim 1, wherein said strings are secured at points by said rings.

5. The device of claim 2, wherein the rings of said grid and the rings of said key overlap on said stakes.

6. The device of claim 4, wherein said rings can be secured on said stakes.

7. The device of claim 4, wherein said strings are attached to said rings.

8. The device of claim 4, wherein said strings are center-aligned with said rings.

9. The device of claim 4, wherein said rings are circular.

10. The device of claim 1, wherein said device can be rolled up or folded up to comprise a small amount of space and be transportable.

* * * * *